United States Patent [19]

McDermott

[11] Patent Number: 4,644,918
[45] Date of Patent: Feb. 24, 1987

[54] KNOCK CONTROL WITH AGC HAVING REDUCED KNOCK DEPENDENCE

[75] Inventor: Michael G. McDermott, Kokomo, Ind.

[73] Assignee: General Motors Corporation, Detroit, Mich.

[21] Appl. No.: 851,813

[22] Filed: Apr. 14, 1986

[51] Int. Cl.⁴ .......................................... F02P 5/145
[52] U.S. Cl. ........................................ 123/425; 73/35
[58] Field of Search .................... 123/425, 435; 73/35, 73/117.3

[56] References Cited

U.S. PATENT DOCUMENTS

| | | | |
|---|---|---|---|
| 4,153,020 | 5/1979 | King et al. | 123/425 |
| 4,312,214 | 1/1982 | Kramer et al. | 73/35 |
| 4,384,473 | 5/1983 | Brandt | 73/35 |
| 4,425,891 | 1/1984 | Kashimura et al. | 123/425 |
| 4,463,722 | 8/1984 | Kobayashi | 123/425 |
| 4,476,709 | 10/1984 | Hattori et al. | 73/35 |
| 4,481,924 | 11/1984 | Kobayashi | 123/425 |
| 4,528,955 | 7/1985 | Sugiura | 123/425 |

FOREIGN PATENT DOCUMENTS 3342466 6/1985 Fed. Rep. of Germany .......... 73/35

Primary Examiner—Andrew M. Dolinar
Attorney, Agent, or Firm—Robert M. Sigler

[57] ABSTRACT

A knock control for a spark ignited, internal combustion engine including an AGC amplifier in which the amplified sensor signal is demodulated, processed and compared to a fixed reference level to generate a pulsed knock signal. An error signal is generated from the difference between the signal input to the comparator and a desired signal voltage level; and the error signal is integrated to create the AGC control signal. The integration rate is decreased during each knock indicating pulse of the pulsed knock signal output of the comparator to reduce the effect of knock on the AGC control voltage and thus stabilize the AGC control. In particular, the error signal is a current level signal; and the input to the integrator includes a series impedance with a bypassing switch controlled by the comparator output to force the input through the impedance only during knock indicating pulses.

2 Claims, 5 Drawing Figures

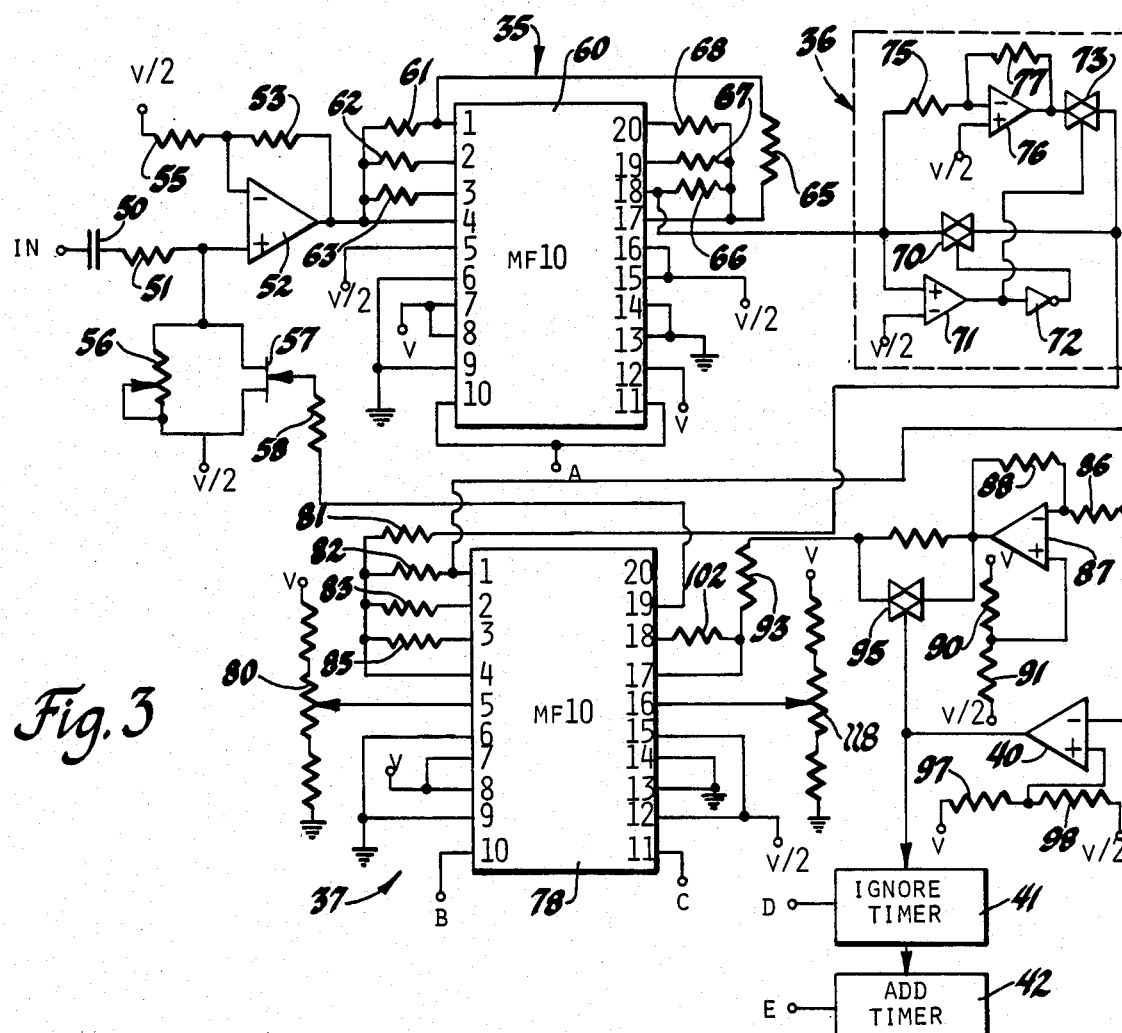
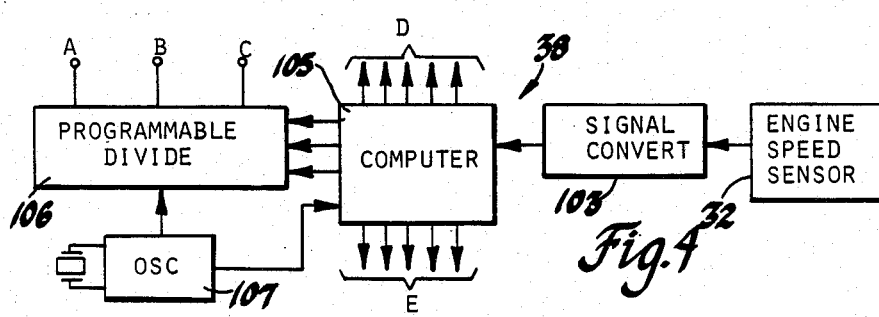
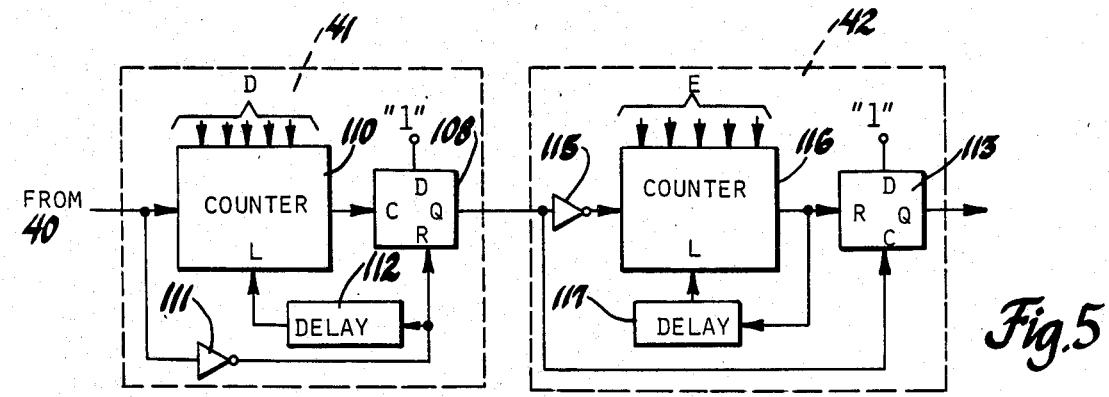
Fig. 3
Fig. 4
Fig. 5

4,644,918

KNOCK CONTROL WITH AGC HAVING REDUCED KNOCK DEPENDENCE

BACKGROUND OF THE INVENTION

This invention relates to knock controls for spark ignited internal combustion engines of the type which sense knock and adjust an engine operating parameter such as ignition timing in order to prevent such knock from exceeding trace levels. Such systems are known in the art as shown in U.S. patents such as Harned et al U.S. Pat. No. 4,002,155, issued Jan. 11, 1977, West U.S. Pat. No. 4,106,477, issued Aug. 15, 1978, West et al U.S. Pat. No. 4,111,035, issued Sept. 5, 1978, Kearney et al U.S. Pat. No. 4,276,861, issued July 7, 1981, Chen et al U.S. Pat. No. 4,364,260, issued Dec. 21, 1982, Brandt U.S. Pat. No. 4,384,473, issued May 24, 1983, and Oh U.S. Pat. No. 4,424,706, issued Jan. 10, 1984. In addition, such systems have been produced on motor vehicles in this and other countries for a number of years.

Such systems generally include a vibration or detonation sensor adapted to sense knock-induced vibrations of the engine and provide an electrical signal thereof to knock measuring circuitry. Eventually, in almost all such systems, a processed signal including knock pulses is compared to a reference voltage level with the output indicative of knock. In a signal amplitude controlled system, some means must be provided to generate a reference level higher than the noise level over which knock peaks may be detected, in spite of varying signal strength due to such factors unrelated to knock intensity as inherent sensor output level and path characteristics between the source of knock vibrations and the sensor. Some of such systems, including most of the systems described in the above-mentioned patents, derive the reference level from the signal itself in a noise channel. Other such systems provide automatic gain control (AGC) for the signal to standardize the average signal level and supply a fixed reference level.

In either case, it is the background noise level which is desired for control; and the effect of knock pulses themselves, either in the noise channel or in the AGC control signal, is a distortion which should be minimized. In the case of the noise channel, apparatus responsive to the knock pulse output of the comparator to inhibit an increase in the noise channel voltage was described and claimed in the above—mentioned patent to West et al U.S. Pat. No. 4,111,035; and a variation was shown in the above-mentioned patents to Kearney et al and to Brandt. However, no such apparatus appears in the prior art showing AGC controls in knock control systems, such as those shown in the patents to King et al U.S. Pat. No. 4,153,020, issued May 8, 1979, Kashimura et al U.S. Pat. No. 4,425,891, issued Jan. 17, 1984, Kobayashi U.S. Pat. No. 4,463,722, issued Aug. 7, 1984, Hattori et al U.S. Pat. No. 4,476,709, issued Oct. 16, 1984, and Kobayashi U.S. Pat. No. 4,481,924, issued Nov. 13, 1984.

In addition, the apparatus shown in the above-mentioned patents to West et al, Kearney et al and Brandt employs a capacitive current integrator in the noise channel with a switch responsive to the comparator output to completely cut off the current input to the integrator. One result of this is that, for the time the integrator input current is cut off, the charge on the capacitor may discharge through a resistive discharge path to ground and thus decrease the noise channel voltage. Although this has not created any problems in knock control during normal vehicle operation of the noise channel type of system, it might be desirable, in the case of an AGC system, for the integrator input current to continue, but at a lower rate, to stabilize the gain of the AGC amplifier.

SUMMARY OF THE INVENTION

The invention is a knock control for a spark ignited, internal combustion engine of the type in which knock induced and other bursts of engine vibrations occur, the knock control comprising, in combination, sensing means responsive to the knock induced and other bursts of engine vibrations to generate an electric signal thereof, amplifying means for the electric signal having a gain controllable by an AGC signal voltage, demodulating means responsive to the output of the amplifying means to generate pulses corresponding to the envelopes of such knock induced and other burst of engine vibrations, signal processing means effective to emphasize the components in the demodulated signal due to knock relative to other components therein, means effective to generate an error signal from the difference between the processed output of the demodulating means and a desired signal voltage level, comparator means effective to compare the processed output of the demodulating means with a fixed knock reference voltage to output a pulsed knock signal, integrator means effective to integrate the pulsed knock signal and generate therefrom an AGC control voltage, the integrator means including integration rate control means responsive to the pulsed knock signal output of the comparator means to slow the integration rate during each pulse thereof and thus reduce the effect of knock on the AGC control voltage, and means effective to generate from the pulsed knock signal output of the comparator means a retard signal and adjust engine spark timing thereby to control knock to a predetermined level.

Other details and advantages of the invention will be apparent from the accompanying drawings and following description of a preferred embodiment.

SUMMARY OF THE DRAWINGS

FIG. 3 is a circuit diagram of a portion of the knock measuring circuit of FIG. 2.

FIG. 4 is a block diagram of an engine speed responsive control for use in the knock measuring circuit of FIG. 2.

FIG. 5 is a circuit diagram of an ignore timer and an add timer for use in the knock measuring circuit of FIGS. 2-3.

DESCRIPTION OF A PREFERRED EMBODIMENT

Figure 1:
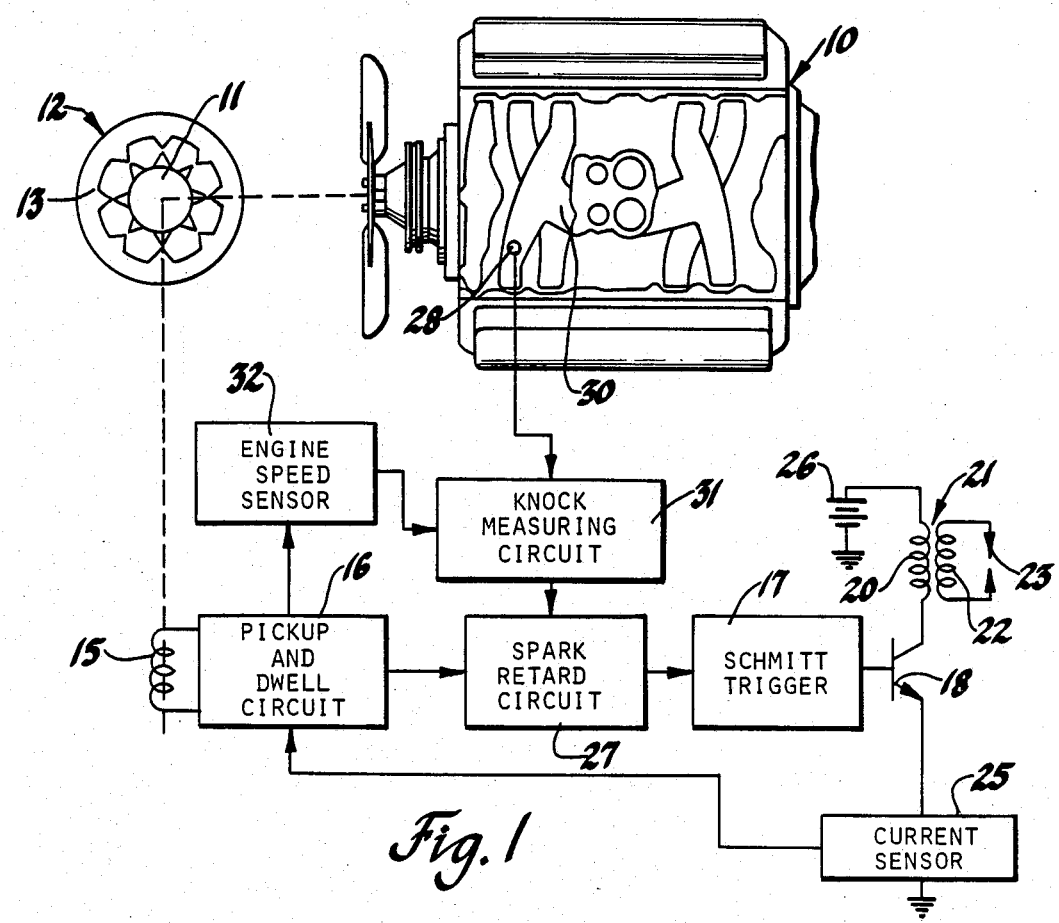
FIG. 1 shows an internal combustion engine including knock control means according to the invention.

Referring to FIG. 1, an internal combustion engine 10 has a rotating crankshaft which drives the rotor 11 of an alternating current signal generator 12. Generator 12 is a standard spark timing signal generator of the variable reluctance type disclosed and described in U.S. Pat. No. 3,254,247, issued to Falge on May 31, 1966. Generator 12 also includes a stator 13 and a pickup coil 15 and provides a plurality of equally spaced projections around rotor 11 and stator 13 related to the number of cylinders in engine 10. Relative rotation between rotor 11 and stator 13 at a speed proportional to engine speed produces a pulsating variation in reluctance which induces an alternating voltage signal in coil 15.

The signal in coil 15 is applied to a pickup and dwell circuit 16, which generates normal spark timing pulses. These normal spark timing pulses could be applied to a Schmitt trigger 17 to control a switching transistor 18 connected to switch current on and off in the primary 20 of spark coil 21. The flow of current in primary 20 causes electromagnetic energy to build up in spark coil 21; and this energy is released, when transistor 18 cuts off current in primary 20, in the form of a high voltage spark pulse in coil secondary 22 applied to spark plug 23. A current sensor 25 provides feedback to pickup and dwell circuit 16 to control the dwell time of current conduction in primary 20. Battery 26 represents the typical automotive 12 volt DC power supply, which powers the spark ignition system. The system so far described is one well known in the art and shown in U.S. Pat. No. 3,828,672, issued to Richards et al on Oct. 1, 1974.

In order to selectively retard the spark timing in response to the detection of engine knock, a spark retard circuit 27 is inserted between pickup and dwell circuit 16 and Schmitt trigger 17. Apparatus suitable for such a circuit is shown and described in the aforementioned West U.S. Pat. No. 4,106,447. However, other appropriate spark retard circuits are well known.

Engine 10 is provided with a vibration or detonation sensor 28, which may be mounted on an intake manifold 30 as shown but may be mounted on the block or other component of engine 10. Examples of such a sensor may be found in the U.S. patents to Huntzinger et al U.S. Pat. No. 4,096,735, issued June 27, 1978, Buck et al U.S. Pat. No. 4,161,665, issued July 17, 1979, Keem U.S. Pat. No. 4,254,354, issued Mar. 3, 1981, Peng et al U.S. Pat. No. 4,371,804, issued Feb. 1, 1983, and Johnston et al U.S. Pat. No. 4,393,688, issued July 19, 1983. In addition, the sensor may be a combustion chamber pressure sensor, which senses directly the pressure vibrations in the combustion gases, if such a sensor provides a usable signal to the system described and claimed herein. The precise nature and location of the sensor are unimportant to the invention and assumed to be well known in the art.

The output signal from vibration sensor 28 is provided to a knock measuring circuit 31 in which a retard signal is generated for application to spark retard circuit 27 to control the retard of the spark timing from the normal spark timing. Apparatus for use as knock measuring circuit 31 is shown in block diagram form in FIG. 2. In addition, an engine speed sensor 32 receives pulses at a rate proportional to engine rotational speed from pickup and dwell circuit 16 and generates therefrom an engine speed signal for application to knock measuring circuit 31 in a manner to be described to vary the characteristics thereof with changing engine speed.

Figure 2:
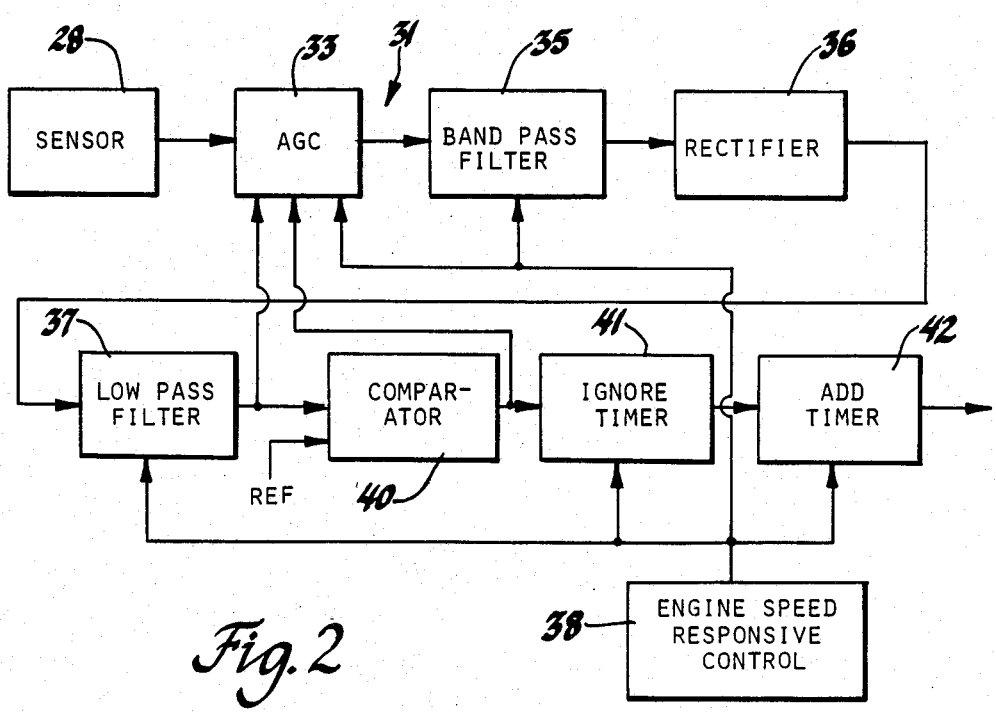
FIG. 2 is a block diagram of a preferred embodiment of a knock measuring circuit for use in the engine of FIG. 1.

Referring to FIG. 2, knock sensor 28 provides an output signal to an AGC amplifier 33, to adapt the control to sensors of varying types and to vibrations of different intensities and conduction paths to sensor 28. The output of AGC amplifier 33 is provided to a bandpass filter 35, which is tuned to a characteristic knock frequency. The bandpass filter improves the signal to noise ratio by responding to signals in the expected frequency range of knock induced vibrations and cutting down some of the low and high frequency noise before submitting the signal for additional processing in the remainder of the circuit. Such bandpass filters are common in prior art knock control circuits; however, bandpass filter 35 is unique in that its center or tuned frequency may be changed in response to a tuning control signal during engine operation to adapt to the changing knock frequency of different engine operating conditions. The tuning control signal is provided by an engine speed responsive control 38, which is shown in block diagram form in FIG. 4 and will be described at a later point in this specification. Specifically, the center frequency of bandpass filter 35 may be increased as engine speed increases. In addition, if it is known that noise at a particular frequency is created in an engine at a particular speed, the bandpass center frequency may be shifted advantageously at that engine speed to avoid that noise but still detect knock. For example, if the knock frequency at 3,000 RPM is 6 KHz but there is a strong noise signal generated at that engine speed at 7 KHz which would be picked up by a filter tuned to 6 KHz, the bandpass filter may be tuned away from the knock frequency in the opposite direction from the noise frequency, such as to 5 KHz, so that some of the knock signal is still picked up but the noise signal is highly reduced.

The output of bandpass filter 35 is demodulated by a rectifier 36 and low pass filter 37. The signal provided to rectifier 36 includes bursts of vibrations at a knock frequency of approximately 6 KHZ. Some of these are produced by knock and some by other engine noise producing mechanisms. In general, the knock induced bursts last significantly longer than those not knock induced. Rectifier 36 and low pass filter 37 output the envelopes of the vibration bursts; and these envelopes comprise pulses having varying duration times, with the longer duration times being more likely to be knock induced. In order to discriminate in favor of longer duration, knock induced pulses, the low pass filter may be of the type shown and described in the aforementioned Brandt patent, which has the frequency and phase characteristics within the frequency band of interest of a matched, time domain filter. A matched filter, used in the time domain, includes memory elements storing a reference time domain waveform and processes all pulses passing through it by changing their shape (generally increasing the amplitude) to emphasize those that approach most closely the reference waveform in the time domain. The Brandt patent shows and describes a frequency domain filter which, for pulses of the type produced by demodulated knock induced vibrations, simulates the response of a matched filter having a reference waveform as shown in that patent. It is believed, however, that the most essential feature of the waveform being matched in the case of knock control is the time duration of the pulse. Therefore, the low pass filter need not, perhaps, closely simulate a matched filter, as long as its cutoff or corner frequency comprises a discrimination reference which discriminates between pulses of time durations typical of knock and those typical of noise.

In any case, as engine speed varies, so do the time durations of knock and noise pulses. The corner frequency of low pass filter 37 is thus variable by a discrimination control signal provided by engine speed responsive control 38. Control 38 provides a signal which causes the corner frequency of low pass filter 37 to vary from its nominal frequency of, for example, 100 Hz, increasing and decreasing directly with engine speed.

Pulses of shorter duration are thus more likely to be passed with a higher relative amplitude at higher engine speeds and more likely to be decreased relatively in amplitude by the filter at lower engine speeds.

The output of low pass filter 37 is provided to one input of a comparator 40, which compares the pulses therein with a knock reference voltage level REF provided at the other input thereof. The output of comparator 40 switches to the state indicating knock for the duration of each pulse having an amplitude which exceeds voltage level REF. Since the output of comparator 40 is ultimately provided to an integrator, the time duration of a pulse which exceeds a reference level is a critical characteristic determining knock intensity in the integrated signal.

Before the output pulses of comparator 40 are integrated, however, they are processed again to eliminate noise pulses. The output of comparator 40 is provided to an ignore timer 41 and then to an add timer 42. The functions of these timers are described in detail in the aforementioned patent to Kearney et al. Basically, the ignore timer 41 shortens each output pulse from comparator 40 by a first predetermined duration, which comprises another discrimination reference. Those pulses having less than the predetermined duration disappear entirely and do not contribute to the integrated knock intensity signal. The add timer does just the opposite, lengthening each remaining pulse by a second predetermined duration greater than the first. This is done to adjust the duration ratio of long to short duration pulses remaining in the signal before integration and thus control the relative contributions of long and short duration pulses to the integrated knock intensity signal in order to provide a better balance between responses to heavy and light intensity knock. The output of the add timer may be provided to an integrator, not shown, to produce an analog retard signal for application to spark retard circuit 27.

In the control of this invention, the ignore time and add time may be varied in response to engine speed. Since the ignore timer discriminates in favor of longer duration pulses, it is a candidate for the same advantageous type of control as the low pass filter 37, already described. The ignore time may be varied inversely with engine speed, to pass shorter pulses at higher engine speeds, in a typical range of 1 to 4 milliseconds. Since the desired add time partially depends on the ignore time, the add time may be varied inversely with engine speed.

Returning to AGC amplifier 33, it includes control circuitry responsive to the outputs of low pass filter 37 and comparator 40 to vary its gain. Specifically, AGC amplifier 33 includes means effective to compare the output level of low pass filter 37 with a desired reference signal voltage level and generate an error signal from the difference, integrate this error signal and provide the integrated signal to the amplifier to control the gain thereof. To prevent undue influence from the higher voltage levels resulting from knock pulses, the integration rate is effectively slowed during knock pulses as indicated by the output of comparator 40.

FIG. 3 is a circuit diagram of a preferred embodiment of most of the system shown in FIG. 2. The circuit is provided with a single ended power supply of standard design, not shown, which has outputs of V and V/2 volts. An input signal from knock sensor 28 is applied through a capacitor 50 and series resistor 51 to the non-inverting input of an op amp 52. Amplifier 52 has an inverting input connected to its output in negative feedback through a resistor 53 and to a source of voltage V/2 through a resistor 55. The non-inverting input of amplifier 52 is further connected to a source of voltage V/2 through, in parallel, a variable resistor 56 and a JFET 57 having a gate receiving an AGC signal through a resistor 58. Items 50–58 comprise a portion of AGC amplifier 33, with the gain being controlled by the voltage applied to the gate of JFET 57. The voltage on the gate of JFET 57 varies its impedance and therefore the ratio of its impedance to that of resistor 51 as a voltage divider applied to the non-inverting input of op amp 52. This effectively controls the gain of op amp 52 for signals introduced through resistor 51. Resistor 56 provides a conductive path if the impedance of JFET 57 becomes too large to limit the total impedance of the parallel combination. The signal is referenced to a "zero" level of V/2 by op amp 52 and may vary therefrom toward V or ground.

The output of amplifier 52 is applied to the input of a switched capacitor bandpass filter 35 comprising the two sides of an MF10 chip 60, one of which is connected as a high pass filter and the other of which is connected as a low pass filter. Chip 60 has pins 6, 9, 13 and 14 grounded, pins 7, 8 and 12 provided with voltage V and pins 5, 15 and 16 provided with voltage V/2. The output of amplifier 52 is connected specifically to pin 4 and, through resistors 61, 62 and 63, respectively, to pins 1, 2, and 3. Pin 1 is connected through a resistor 65 to pin 17 to provide an output from the filter on the left side of the chip to an input of the filter on the right side of the chip. Pin 17 is connected through resistors 66, 67 and 68, respectively, to pins 18, 19 and 20. Pins 10 and 11 are provided with a tuning control signal A, a pulse train the frequency of which simultaneously controls the corner frequencies of the high and low pass filters and thus the center frequency of the bandpass filter.

Pin 18 provides an output to rectifier 36, specifically to an analog switch 70. The same signal is also provided to the non-inverting input of a op amp 71 having an inverting input provided with voltage V/2 and an output controlling switch 70 through an inverter 72 and further controlling another analog switch 73. The output from pin 18 of chip 60 is further provided through a resistor 75 to the inverting input of a op amp 76 having an output connected to analog switch 73 and, through a feedback resistor 77, to its inverting input. Op amp 76 further has a non-inverting input provided with voltage V/2. In operation, op amp 71 acts as a comparator to compare the input signal with V/2, the "zero" level voltage, and activate one or the other of analog switches 70 and 73, depending on whether the input voltage is above or below V/2. If switch 70 is activated, it passes the signal through unchanged. If switch 73 is activated, it passes the signal through inverted by op amp 76. Rectifier 36 is thus a full wave rectifier which passes a signal varying between V/2 and V volts.

The outputs of switches 70 and 73 are tied together and, through a resistor 81, to pin 4 of another MF10 chip 78. The left side of chip 78, including pins 1–10, is connected as low pass filter 37. Pins 6 and 9 are grounded; pins 7 and 8 are provided with voltage V; and pin 5 is connected to the tap of a resistive voltage divider 80 connected between voltage V and ground. Pin 4 of chip 78 is connected through resistors 82, 83 and 85, respectively, to pins 1, 2 and 3. Pin 10 of chip 78 is provided with a discrimination control signal B, a pulse train the frequency of which controls the corner frequency of low pass filter 37.

Pin 1 of chip 78 is the output of low pass filter 37 and is connected to the inverting input of comparator 40, which is an op amp having a non-inverting input connected through a resistor 97 to the source of voltage V and through a resistor 98 to the source of voltage V/2. The voltage provided to the non-inverting input of comparator 40 is the voltage REF, previously described. Comparator 40 produces a two valued output, either high or low voltage, depending on which of the inverting and non-inverting inputs sees the higher voltage. The output thus comprises positive going pulses for the duration of the demodulated signal from pin 1 of chip 78 above the knock reference voltage REF at the junction of resistors 97 and 98. The output of comparator 40 is connected to the input of ignore timer 41, the output of which is connected to the input of add timer 42. Ignore timer 41 and add timer 42 will be discussed in more detail at a later point in this specification with reference to FIG. 5.

Still referring to FIG. 3, pin 1 of chip 78 is also connected through a resistor 86 to the inverting input of an op amp 87 having an output connected to its inverting input through a feedback resistor 88 and a non-inverting input connected through a resistor 90 to the source of voltage V and through a resistor 91 to the source of voltage V/2. The output of op amp 87 is connected through series resistors 92 and 93 to pin 17 of chip 78. Resistor 93 is bypassed by an analog switch 95, controlled by the output of comparator 40.

The right side of chip 78, including pins 11–20, is connected as an integrator. Pins 13 and 14 are grounded; pins 12 and 15 are provided with voltage V/2; pin 16 is provided with a voltage from the tap of resistive voltage divider 118, connected between the source of voltage V and ground; and pin 17 is connected, through resistor 102, to pin 18. Pin 19 is the integrator output and is connected through resistor 58 to the gate of JFET 57. The integrator of chip 78, together with items 86–95, comprise a further portion of AGC amplifier 33, which portion provides the control signal for the gain thereof. The desired normal voltage level of the signal is set by resistors 90 and 91 between voltages V/2 and V and less than knock reference level REF, so that only positive going knock pulses will trigger comparator 40. An error signal is generated by op amp 87 and integrated in chip 78 to create the AGC signal applied to JFET 57. In order to reduce the effect of knock pulses on the AGC signal, the integration rate is greatly reduced during such pulses. In this embodiment the reduction is performed by resistor 92 and bypass switch 95, the latter of which is switched off by comparator 40 during each knock pulse to insert resistor 92 in the input path to the integrator and thus decrease input current thereto, with consequent slowing of the integration rate. This reduces the effect of knock pulses on the AGC feedback signal voltage without allowing that voltage to decrease by the discharge of the capacitance within the integrator of the MF10 chip 78. Signal C is provided to chip 78 as a pulse train with a constant frequency, since switch 95 handles the integration rate control. However, if desired, the integration rate could also be controlled by the frequency of the pulses in signal C, by providing the pulse output from comparator 40 to the control which generates signal C, yet to be described. In the latter case, that control would change the pulse frequency of signal C to cause a slower integration rate whenever a knock pulse was occurring. However, the method shown is preferred, due to its relative simplicity and low expense.

Engine speed responsive control 38 is shown in FIG. 4. The signal from speed sensor 32, which may be obtained, for example, from pickup and dwell circuit 16 at the TACH output of the standard distributor used on vehicles manufactured by the assignee of this invention, is provided to signal convert apparatus 103, which counts pulses for a reference time and outputs the number thereof to computer 105. Computer 105 is a microprocessor based computer, for example of the Motorola 6800 (R) series, which includes tables of stored constants addressable by the input number from signal convert apparatus 103 to determine signals A–E. Signals D and E are generated by direct table lookup with storage in a parallel output register or device, from which they may be read in to the parallel input of preloadable down counters, yet to be described, in ignore timer 41 and add timer 42. However, signals A–C are generated in a programmable divide apparatus 106, which divides a clock signal from crystal oscillator 107 according to control inputs received from computer 105. Apparatus 106 may include, for each of signals A–C, preloadable down counters which repeatedly count the clock pulses down to zero, reload themselves and generate an output pulse for each downcount, so that the outputs are divided frequencies of the inputs.

Computer 105 may be programmed to respond to an interrupt from signal convert apparatus 103 to read in the number therefrom and perform the required table lookups. The interrupt program will then output the specified numbers to output registers for signals D and E and to programmable divide apparatus 106 for signals A–C. Programmable divide apparatus 106 includes programmable divide circuits which divide the clock frequency according to the input numbers for output signals A–C at reduced clock rates to control the MF10 chips 60 and 78. The stored numbers used to generate signals D and E represent numbers of clock pulses counted in ignore timer 41 and add timer 42 for specified time durations generated thereby. The numbers stored for generation of signal A–C may also be numbers loaded into counters and used therein to divide the clock frequency and generate new clock signals at lower frequencies. Those skilled in the art, once familiar with this specification, will easily be able to design detailed circuits for use in the devices of FIG. 4 and will also be able to code the simple programs needed for computer 105; and there is thus no need for detailed descriptions in this specification.

Ignore timer 41 and add timer 42 are shown in FIG. 5. Ignore timer 41 comprises a flip-flop 108 having a permanently high D input and a clock input clocked by the output of a preloadable down counter 110, which is triggered to count by a leading edge of a pulse from comparator 40. Counter 110 counts clock pulses from a reference oscillator such as oscillator 107, starting from a value previously loaded as signal D. Counter 110 thus delays the leading edge of each pulse output by comparator 40 before it reaches flip-flop 108. The falling edge of each such pulse, however, is passed immediately through an inverter 111 to the reset input of flip-flop 108, as well as through a delay circuit 112 to the load input of counter 110. Delay circuit 112 provides a slight delay as necessary only to ensure proper operation of the circuit. Counter 110 thus delays the leading edge of the pulses to shorten the time duration thereof by a time period determined by the clock rate and the discrimination control signal D.

Add timer 42 comprises a flip-flop 113 with a clock input connected to the Q output of flip-flop 108 and a permanently high D input. The Q output of flip-flop 113 is thus switched high with the leading edge of the output of flip-flop 108. The Q output of flip-flop 108 is also connected through an inverter 115 to the trigger input of a preloadable down counter 116 having a load input adapted to receive signal E and an output connected to the reset input of flip-flop 113. The output of counter 116 is also provided, through a delay circuit 117, to the load input thereof. Delay circuit 117 provides a slight time delay only as necessary for the proper operation of the circuit. Counter 116 thus delays the falling edge of the pulses output by flip-flop 108 to extend the pulse time duration by a time period determined by the clock rate and the signal E.

The embodiments of the invention in which an exclusive property or privilege is claimed are defined as follows:

1. A knock control for a spark ignited, internal combustion engine of the type in which knock induced and other bursts of engine vibrations occur, the knock control comprising, in combination:

sensing means responsive to the knock induced and other bursts of engine vibrations to generate an electric signal thereof;

amplifying means for the electric signal having a gain controllable by an AGC signal voltage;

demodulating means responsive to the output of the amplifying means to generate pulses corresponding to the envelopes of such knock induced and other burst of engine vibrations;

signal processing means effective to emphasize the components in the demodulated signal due to knock relative to other components therein;

means effective to generate an error signal from the difference between the processed output of the demodulating means and a desired signal voltage level;

comparator means effective to compare the processed output of the demodulating means with a fixed knock reference voltage to output a pulsed knock signal;

integrator means effective to integrate the pulsed knock signal and generate therefrom an AGC control voltage, the integrator means including integration rate control means responsive to the pulsed knock signal output of the comparator means to slow the integration rate during each pulse thereof and thus reduce the effect of knock on the AGC control voltage and thus stabilize the AGC control; and means effective to generate from the pulsed knock signal output of the comparator means a retard signal and adjust engine spark timing thereby to control knock to a predetermined level.

2. A knock control according to claim 1 in which the error signal is a current signal provided to the integrator and the integrator means is effective to integrate an input current with an internal capacitance and includes an input resistor with a bypass switch controlled by the pulsed knock signal output of the comparator means to force input current to the integrator means through the resistor to reduce the input current level and thus the integration rate only during pulses of the pulsed knock signal.

* * * * *